(12) United States Patent
Horng

(10) Patent No.: US 9,290,976 B1
(45) Date of Patent: Mar. 22, 2016

(54) POSITION-LIMIT HINGE

(71) Applicant: Chin-Hsing Horng, Taoyuan (TW)

(72) Inventor: Chin-Hsing Horng, Taoyuan (TW)

( * ) Notice: Subject to any disclaimer, the term of this patent is extended or adjusted under 35 U.S.C. 154(b) by 0 days.

(21) Appl. No.: 14/521,348

(22) Filed: Oct. 22, 2014

(51) Int. Cl.
*E05D 3/12* (2006.01)
*E05D 11/06* (2006.01)
*E05D 3/06* (2006.01)
*G06F 1/16* (2006.01)

(52) U.S. Cl.
CPC *E05D 11/06* (2013.01); *E05D 3/06* (2013.01); *E05D 3/12* (2013.01); *G06F 1/1681* (2013.01); *G06F 1/162* (2013.01); *G06F 1/1616* (2013.01); *G06F 1/1618* (2013.01); *Y10T 16/547* (2015.01); *Y10T 16/5478* (2015.01)

(58) Field of Classification Search
CPC ............. E05D 11/06; E05D 3/06; E05D 3/12; E05D 3/122; G06F 1/1616; G06F 1/1618; G06F 1/162; G06F 1/1681; Y10T 16/547; Y10T 16/5474; Y10T 16/5478; Y10T 16/54035
See application file for complete search history.

(56) References Cited

U.S. PATENT DOCUMENTS

| | | | | |
|---|---|---|---|---|
| 5,278,725 A * | 1/1994 | Konno | ................... | G06F 1/1616 16/223 |
| 5,493,760 A * | 2/1996 | Takimoto | ................... | E05D 3/12 16/366 |
| 5,659,929 A * | 8/1997 | Cheng | ....................... | E05D 3/12 16/366 |
| 5,666,694 A * | 9/1997 | Slow | ...................... | G06F 1/1618 16/308 |
| 6,154,359 A * | 11/2000 | Kamikakai | ........... | G06F 1/1618 16/342 |
| 7,512,426 B2 * | 3/2009 | Maatta | ................ | H04M 1/0218 16/354 |
| 7,515,707 B2 * | 4/2009 | Ka | ......................... | G06F 1/1616 16/366 |
| 7,832,056 B2 * | 11/2010 | Kuwajima | ............ | H04M 1/022 16/282 |
| 8,687,354 B2 * | 4/2014 | Uchiyama | ................. | E05D 3/12 16/330 |
| 8,776,319 B1 * | 7/2014 | Chang | ................... | G06F 1/1681 16/303 |
| 8,904,601 B2 * | 12/2014 | Hsu | ...................... | H04M 1/0216 16/366 |
| 8,931,141 B2 * | 1/2015 | Chen | ...................... | H04M 1/022 16/366 |
| 8,938,856 B1 * | 1/2015 | Shin | ......................... | E05D 3/06 16/365 |
| 8,959,715 B2 * | 2/2015 | Hsu | ........................... | E05D 3/06 16/227 |
| 8,959,716 B2 * | 2/2015 | Hsu | ........................... | E05D 3/06 16/302 |
| 8,959,719 B2 * | 2/2015 | Hsu | ....................... | G06F 1/1618 16/303 |
| 8,959,720 B2 * | 2/2015 | Hsu | ....................... | G06F 1/1681 16/303 |
| 8,966,715 B1 * | 3/2015 | Chen | ....................... | F16H 19/08 16/303 |

(Continued)

*Primary Examiner* — Jeffrey O Brien

(57) ABSTRACT

A position-limit hinge includes an axle housing, a first hinge shaft, a second hinge shaft, a first position-limit device set and a second position-limit device set. By means of enabling the first position-limit device set and the second position-limit device set to be alternatively changed between a position-limit status and a freely rotatable status, the first hinge shaft is driven to rotate or the axle housing is driven to turn about the second hinge shaft, enabling a cover member of an electronic device carrying the position-limit hinge to be smoothly opened relative to a base member.

6 Claims, 15 Drawing Sheets

(56) References Cited

U.S. PATENT DOCUMENTS

| | | | | |
|---|---|---|---|---|
| 8,978,209 B1* | 3/2015 | Lin | G06F 1/1618 | 16/303 |
| 9,003,606 B2* | 4/2015 | Hsu | G06F 1/1681 | 16/366 |
| 9,009,919 B1* | 4/2015 | Chiang | G06F 1/1681 | 16/303 |
| 9,021,658 B1* | 5/2015 | Yang | G06F 1/1681 | 16/366 |
| 9,021,659 B2* | 5/2015 | Lin | E05D 11/06 | 16/303 |
| 9,104,381 B2* | 8/2015 | Kuramochi | G06F 1/1681 | |
| 9,127,490 B2* | 9/2015 | Chen | E05D 3/122 | |
| 9,134,767 B2* | 9/2015 | Chen | G06F 1/1681 | |
| 2008/0134468 A1* | 6/2008 | Chen | G06F 1/1616 | 16/340 |
| 2015/0040704 A1* | 2/2015 | Hsu | G06F 1/1681 | 74/98 |
| 2015/0047152 A1* | 2/2015 | Cheng | E05D 3/122 | 16/354 |
| 2015/0092331 A1* | 4/2015 | Kinoshita | G06F 1/1681 | 361/679.09 |
| 2015/0101148 A1* | 4/2015 | Lee | G06F 1/1681 | 16/319 |
| 2015/0160695 A1* | 6/2015 | Su | E05D 3/12 | 16/366 |
| 2015/0173218 A1* | 6/2015 | Hsu | E05D 3/12 | 16/366 |
| 2015/0189777 A1* | 7/2015 | Hsu | H05K 5/0226 | 16/366 |
| 2015/0227175 A1* | 8/2015 | Motosugi | G06F 1/1681 | 16/341 |
| 2015/0245510 A1* | 8/2015 | Hsu | H05K 5/0226 | 16/250 |
| 2015/0245511 A1* | 8/2015 | Hsu | E05D 3/122 | 74/63 |
| 2015/0267450 A1* | 9/2015 | Chiang | E05D 11/00 | 16/354 |
| 2015/0309539 A1* | 10/2015 | Kamphuis | G06F 1/1681 | 361/679.27 |
| 2015/0309541 A1* | 10/2015 | Horng | G06F 1/16 | 16/250 |

* cited by examiner

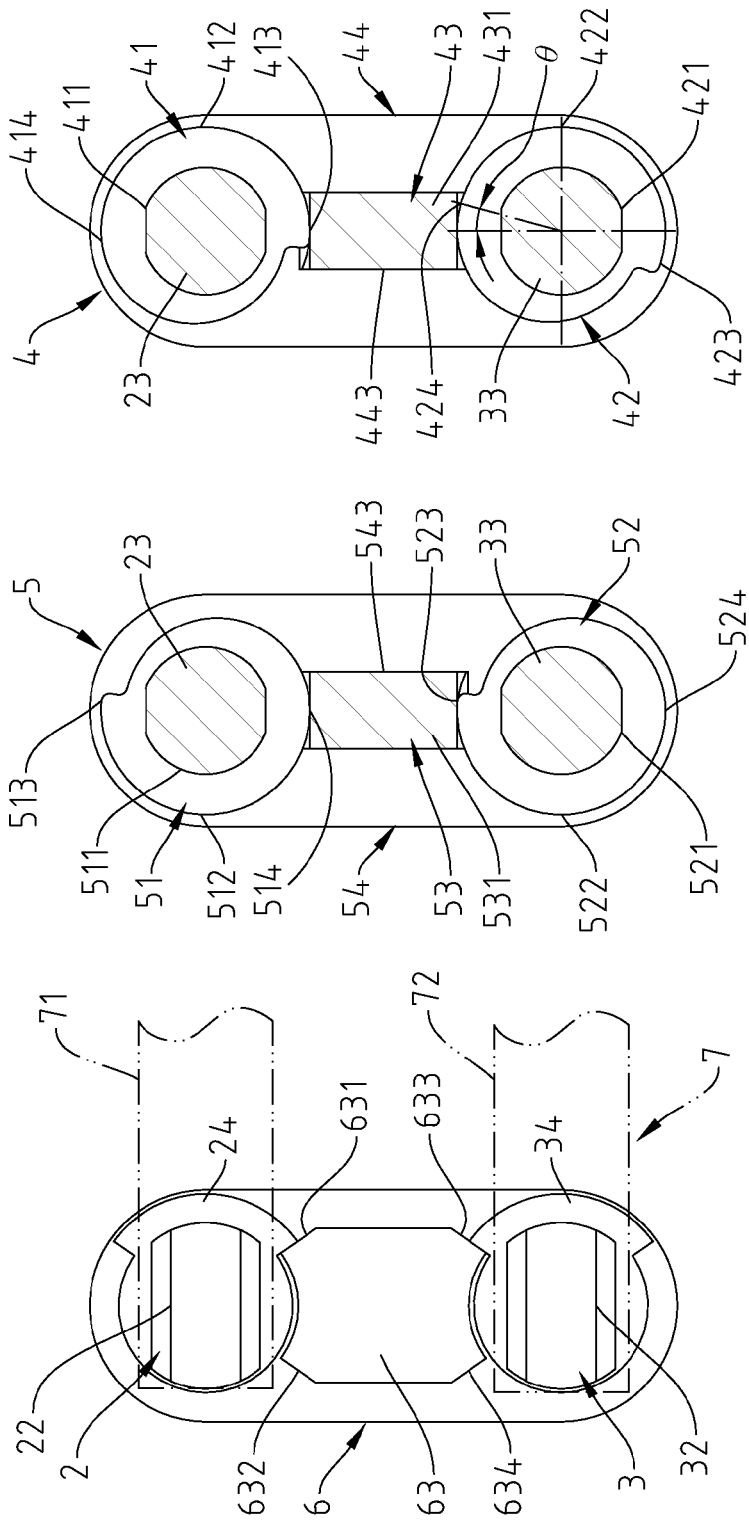

C-C

D-D

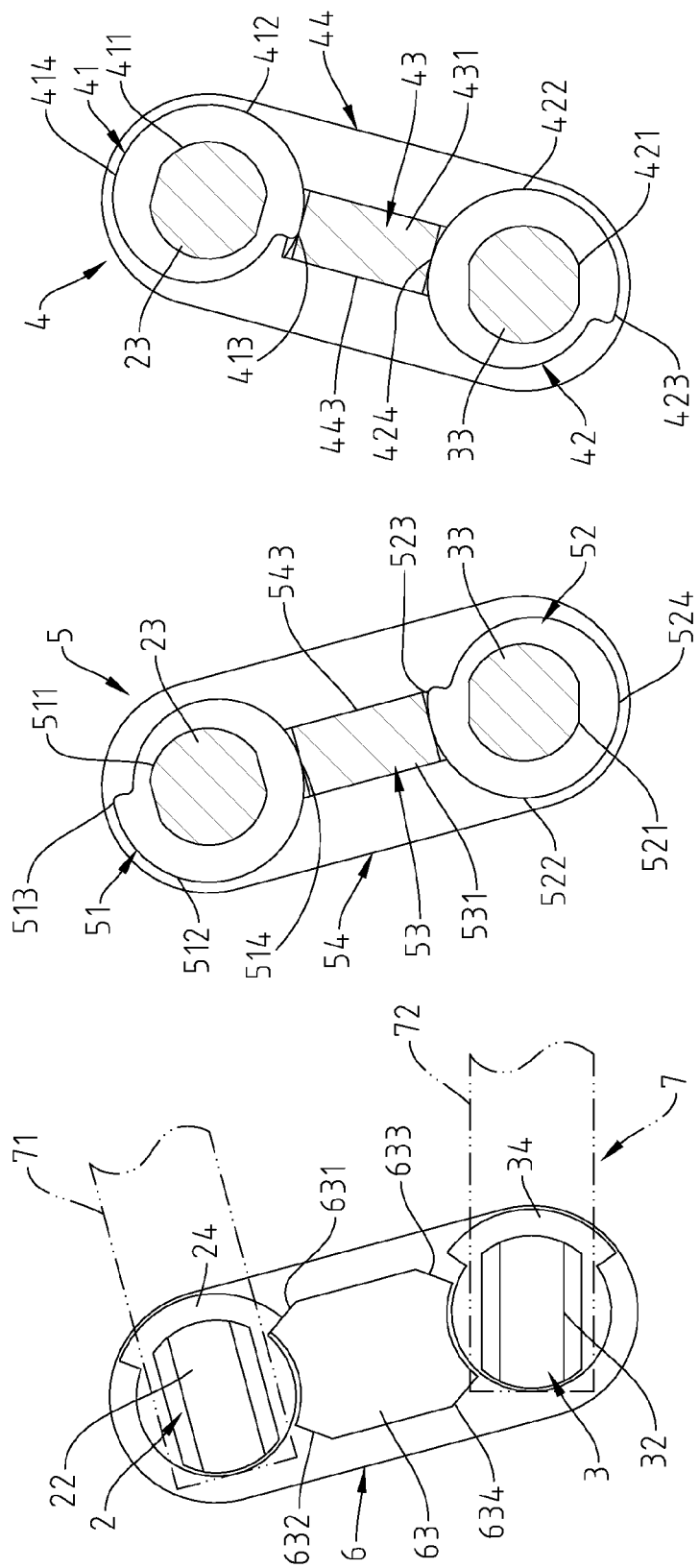

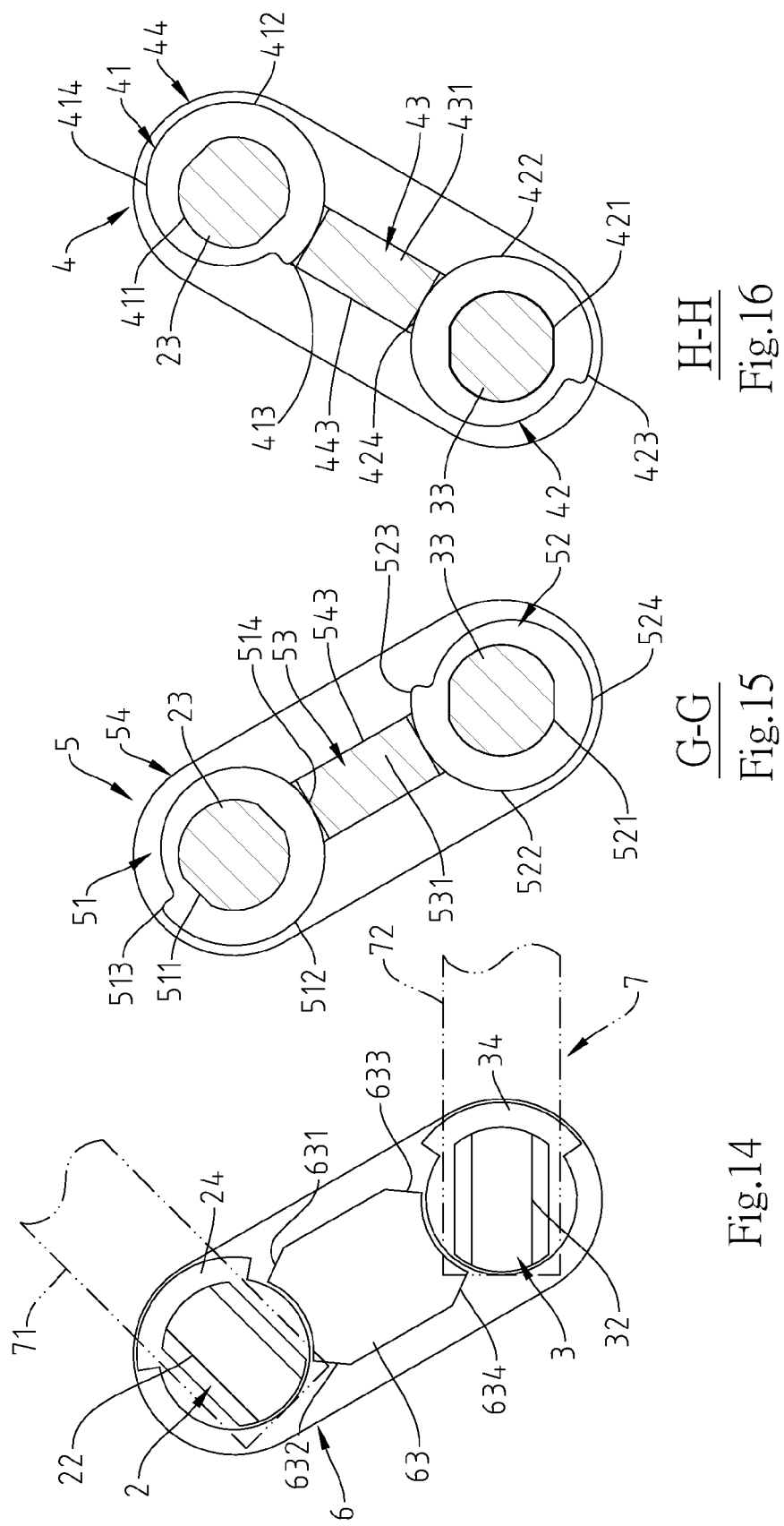

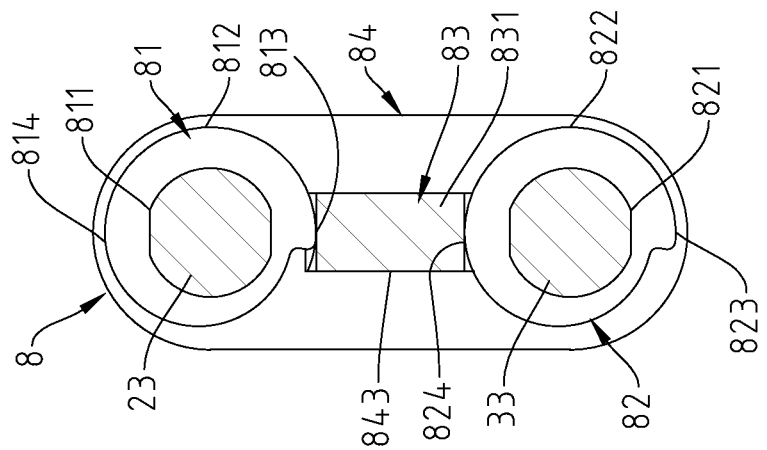
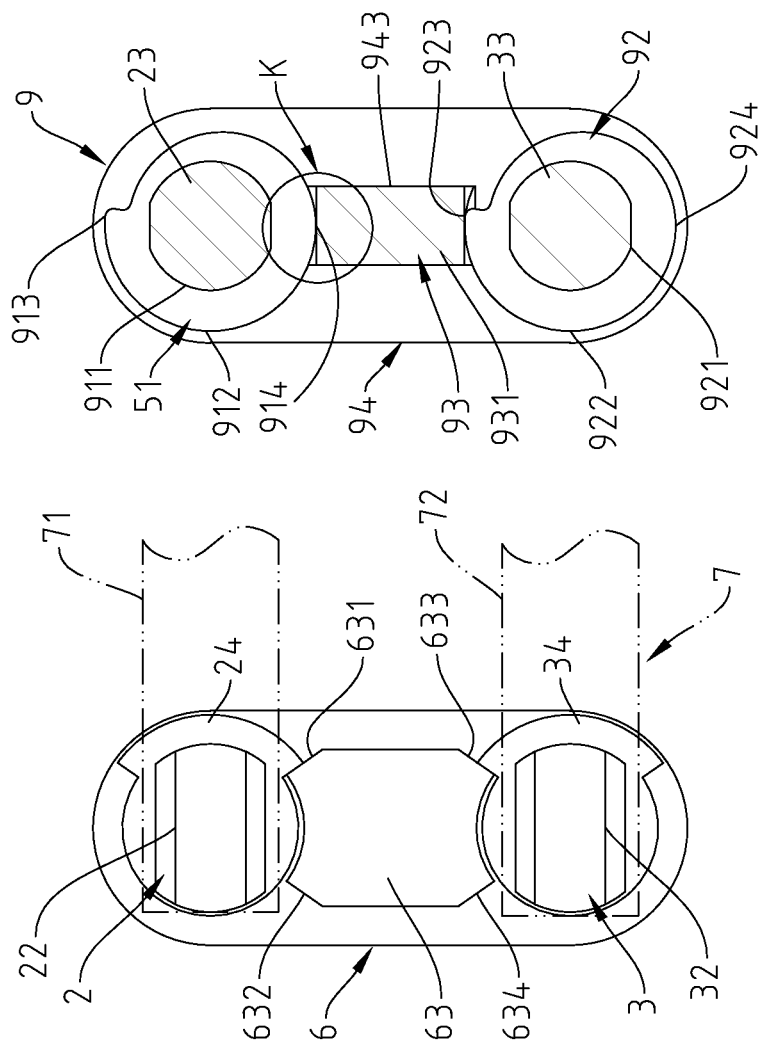

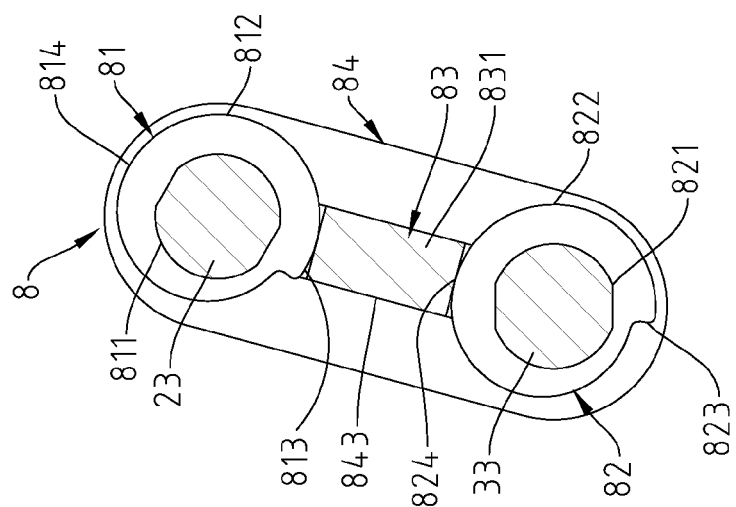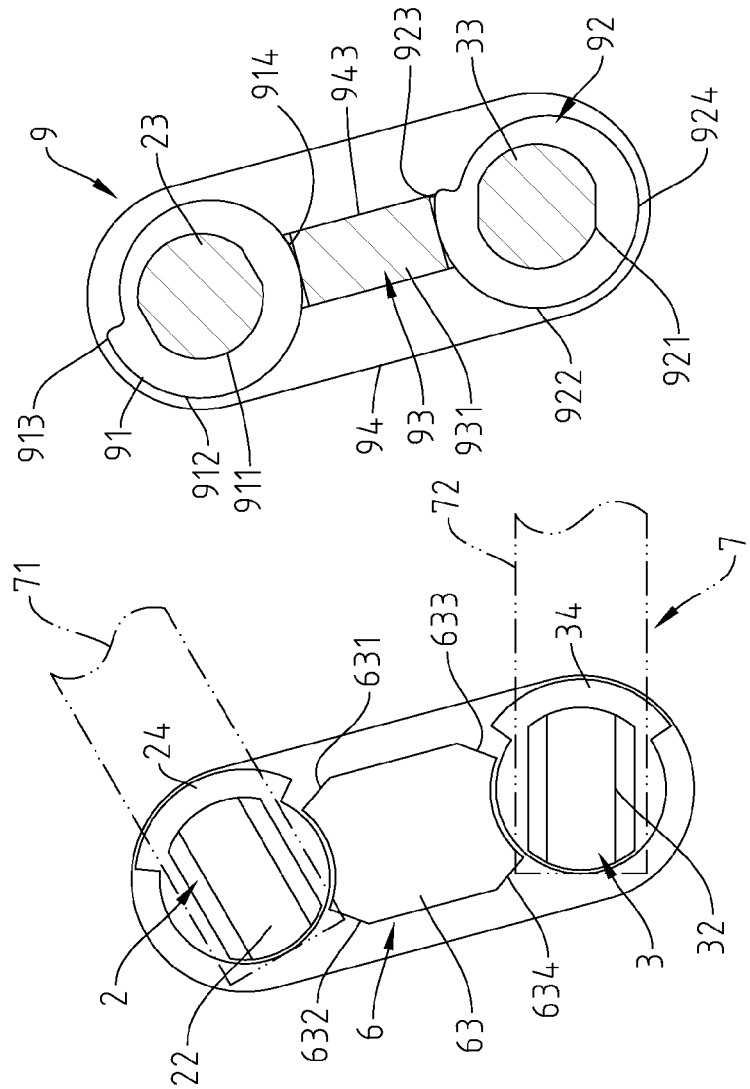

POSITION-LIMIT HINGE

BACKGROUND OF THE INVENTION

1. Field of the Invention

The present invention relates to hinge technology and more particularly, to a position-limit hinge for use in a dual-leaf electronic device, which allows the cover member of the dual leaf electronic device to be turned from the top side of the base member to the bottom side thereof.

2. Description of the Related Art

A dual-leaf electronic device such as notebook computer, smart phone, etc. generally comprises a base member and a cover member, wherein the cover member of the electronic device can be turned from the top side of the base member to the bottom side thereof, enabling the electronic device to be used as a tablet computer. A dual-leaf electronic device uses a dual-shaft hinge for enabling the cover member thereof to be turned through 360°. When opening the cover member of the dual-leaf electronic device through 360°, the first hinge shaft is rotated through 180° and then the second hinge shaft is rotated through another 180°. However, when turned the cover member through 180°, the cover member and the base member are not kept on a plane, leading to the destruction of the sense of beauty. A link can be used for enabling the first hinge shaft and the second hinge shaft to be rotated synchronously so that when the cover member is turned through 180°, the cover member and the base member can be kept on a plane. However, the use of the link can produce an idle stroke, i.e., the first hinge shaft and the second hinge shaft cannot be accurately synchronously rotated for enabling the cover member to be turned smoothly. Further, for use in an electronic device having light, thin, short and small characteristics, the size of the hinge must be relatively reduced. However, reducing the size of the hinge will relatively reduce the strength of the link, and the link can easily be forced to break by an external force.

SUMMARY OF THE INVENTION

The present invention has been accomplished under the circumstances in view. It is therefore the main object of the present invention to provide a position-limit hinge, which uses a first position-limit device set and a second position-limit device set to let a first hinge shaft to be rotated or an axle housing to be turned about a second hinge shaft, enabling a cover member of an electronic device carrying the position-limit hinge to be smoothly opened relative to a base member.

To achieve this and other objects of the present invention, a position-limit hinge of the invention comprises an axle housing, a first hinge shaft, a second hinge shaft, a first position-limit device set and a second position-limit device set. The axle housing comprises a first axle hole and a second axle hole.

The first hinge shaft comprises a first shaft portion located at one end thereof and rotatably inserted into the first axle hole of the axle housing, a first mounting portion located at an opposite end thereof outside the axle housing and fixedly fastened to a cover member of an electronic device, and a first position-limit portion spaced between the first shaft portion and the first mounting portion and exposed to the outside of the axle housing. The second hinge shaft comprises a second shaft portion located at one end thereof and rotatably inserted into the second axle hole of the axle housing, a second mounting portion located at an opposite end thereof and fixedly fastened to a base member of the electronic device outside the axle housing, and a second position-limit portion spaced between the second shaft portion and the second mounting portion and exposed to the outside of the axle housing.

The first position-limit device set comprises a first cam wheel, a second cam wheel, and a first position-limit member. The first cam wheel comprises a first mounting hole fastened to the first position-limit portion of the first hinge shaft, and a first actuation barrel surrounding the first mounting hole. The second cam wheel comprises a second mounting hole fastened to the second position-limit portion of the second hinge shaft, and a second actuation barrel surrounding the second mounting hole. The first position-limit member is disposed between the first cam wheel and the second cam wheel, having opposing top and bottom sides thereof respectively stopped at the first actuation barrel and the second actuation barrel.

The second position-limit device set comprises a third cam wheel, a fourth cam wheel, and a second position-limit member. The third cam wheel comprises a third mounting hole fastened to the first position-limit portion of the first hinge shaft, and a third actuation barrel surrounding the third mounting hole. The fourth cam wheel comprises a fourth mounting hole fastened to the second position-limit portion of the second hinge shaft, and a fourth actuation barrel surrounding the fourth mounting hole. The second position-limit member is disposed between the third cam wheel and the fourth cam wheel, having opposing top and bottom sides thereof respectively stopped at the third actuation barrel and the fourth actuation barrel.

BRIEF DESCRIPTION OF THE DRAWINGS

FIG. 3 is a front view of the position-limit hinge in accordance with the first embodiment of the present invention.

FIG. 4 is a sectional view taken along line A-A of FIG. 1.

FIG. 5 is a sectional view taken along line B-B of FIG. 1.

FIG. 10 is a schematic front view of the first embodiment of the present invention, illustrating an operation status of the position-limit hinge.

FIG. 11 is a sectional view taken along line E-E of FIG. 9.

FIG. 12 is a sectional view taken along line F-F of FIG. 9.

FIG. 14 is a schematic front view of the first embodiment of the present invention, illustrating another operation status of the position-limit hinge.

FIG. 15 is a sectional view taken along line G-G of FIG. 13.

FIG. 16 is a sectional view taken along line H-H of FIG. 13.

FIG. 19 is a front view of the position-limit hinge in accordance with the second embodiment of the present invention.

FIG. 20 is a sectional view taken along line I-I of FIG. 18.

FIG. 21 is a sectional view taken along line J-J of FIG. 18.

FIG. 24 is a schematic front operational view of the position-limit hinge in accordance with the second embodiment of the present invention.

FIG. 25 is a sectional view taken along line L-L of FIG. 23.

FIG. 26 is a sectional view taken along line M-M of FIG. 23.

DETAILED DESCRIPTION OF THE PREFERRED EMBODIMENT

Figure 1:
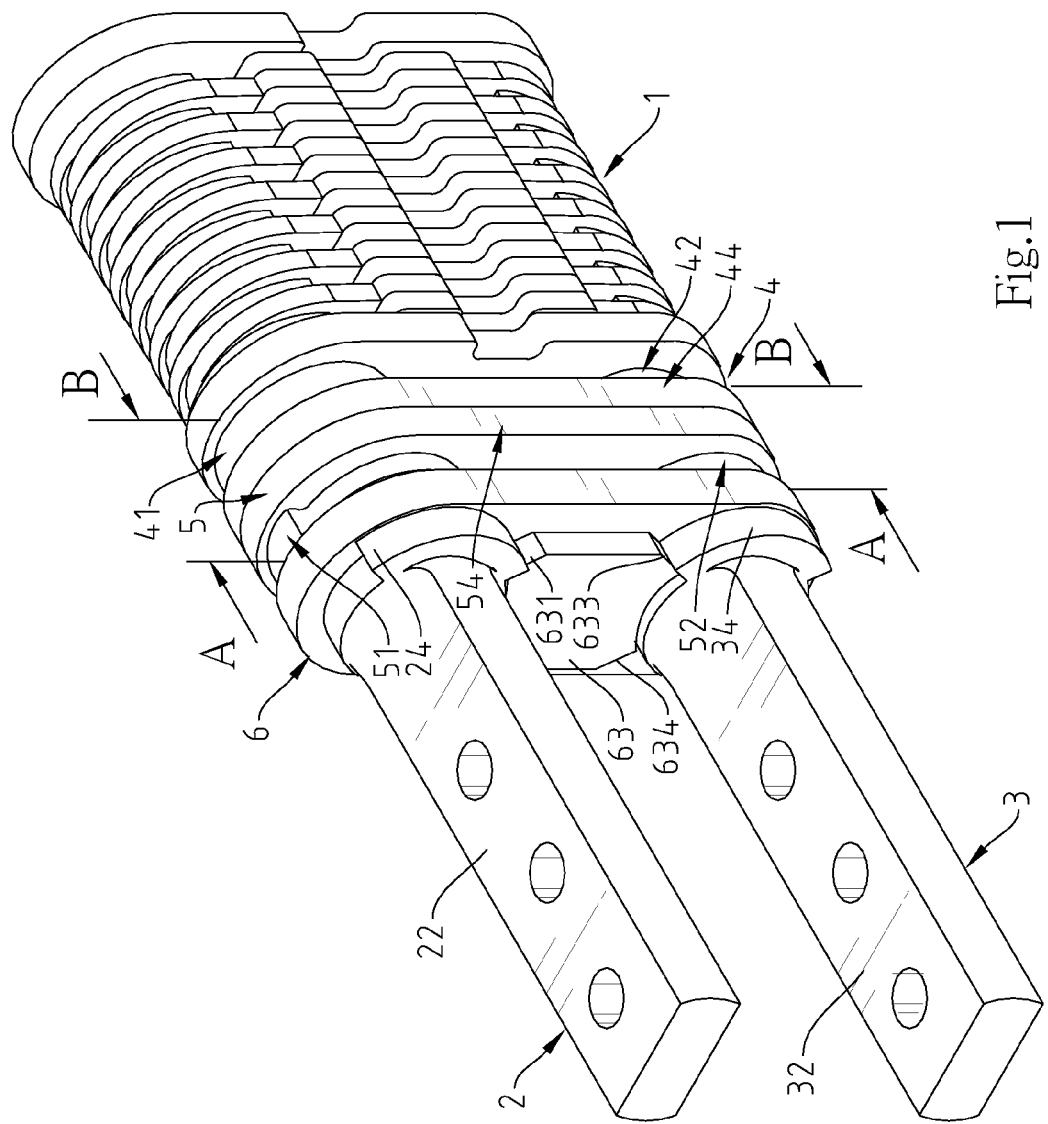
FIG. 1 is an elevational view of a position-limit hinge in accordance with a first embodiment of the present invention.
Figure 2:
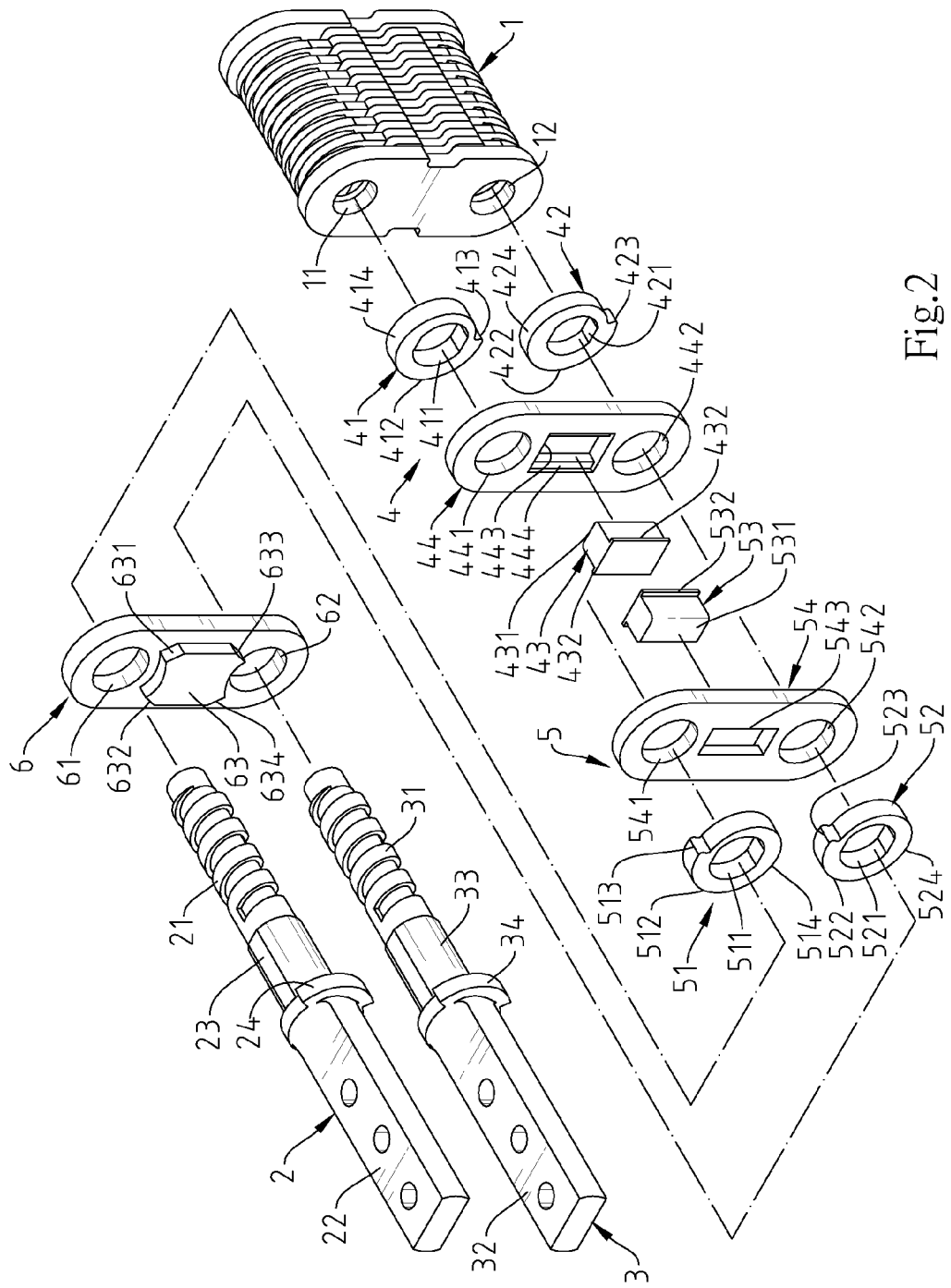
FIG. 2 is an exploded view of the position-limit hinge in accordance with the first embodiment of the present invention.
Figure 6:
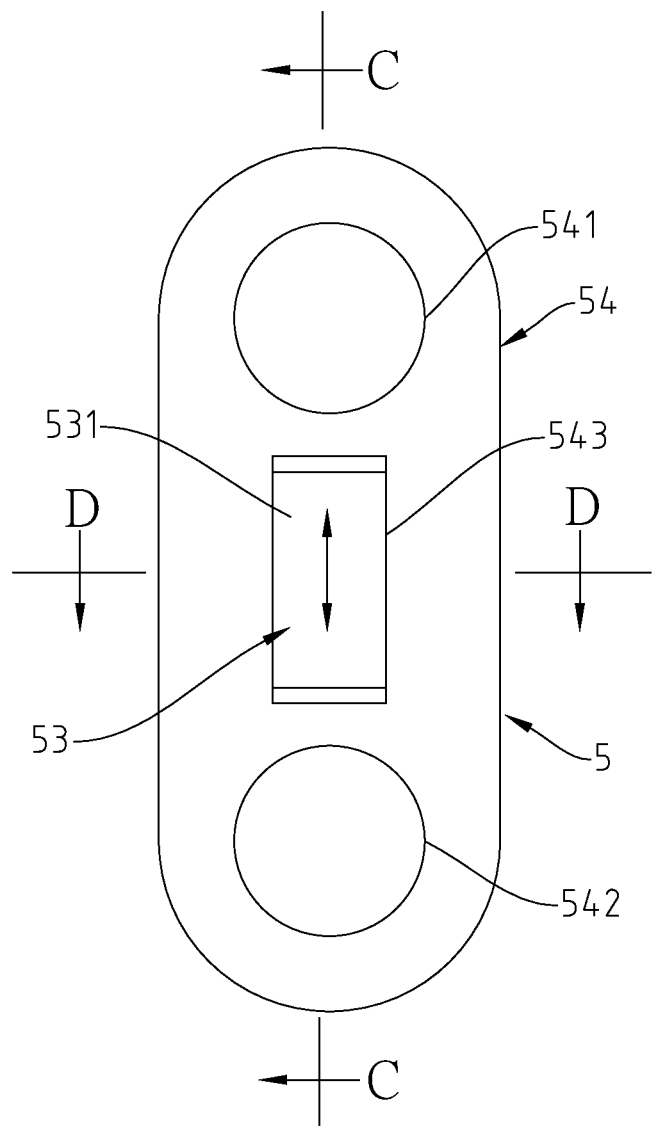
FIG. 6 is a front view of the first position-limit device set and second position-limit device set of the position-limit hinge in accordance with the first embodiment of the present invention.
Figure 7:
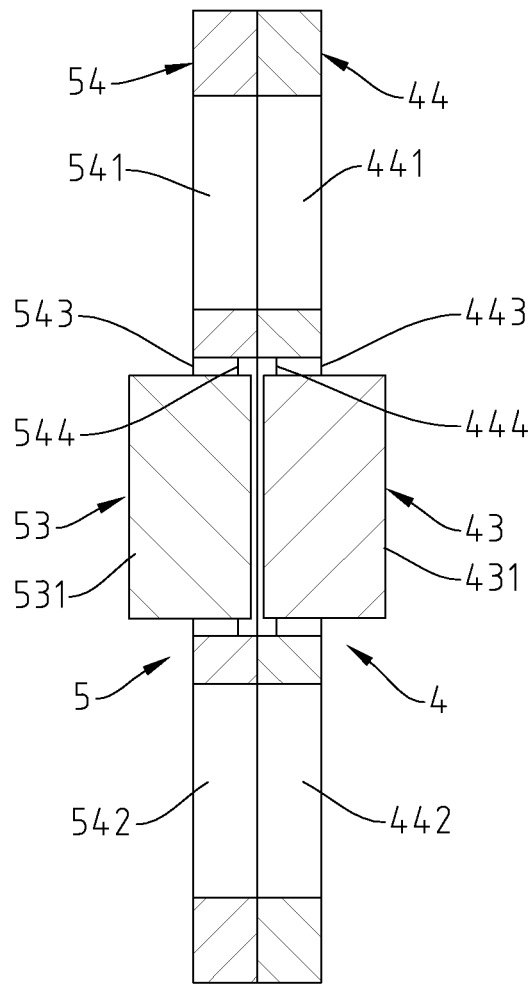
FIG. 7 is a sectional view taken along line C-C of FIG. 6.
Figure 8:
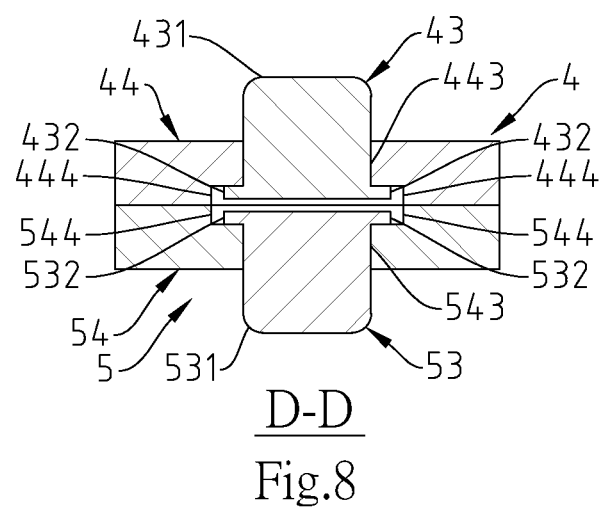
FIG. 8 is a sectional view taken along line D-D of FIG. 6.
Figure 9:
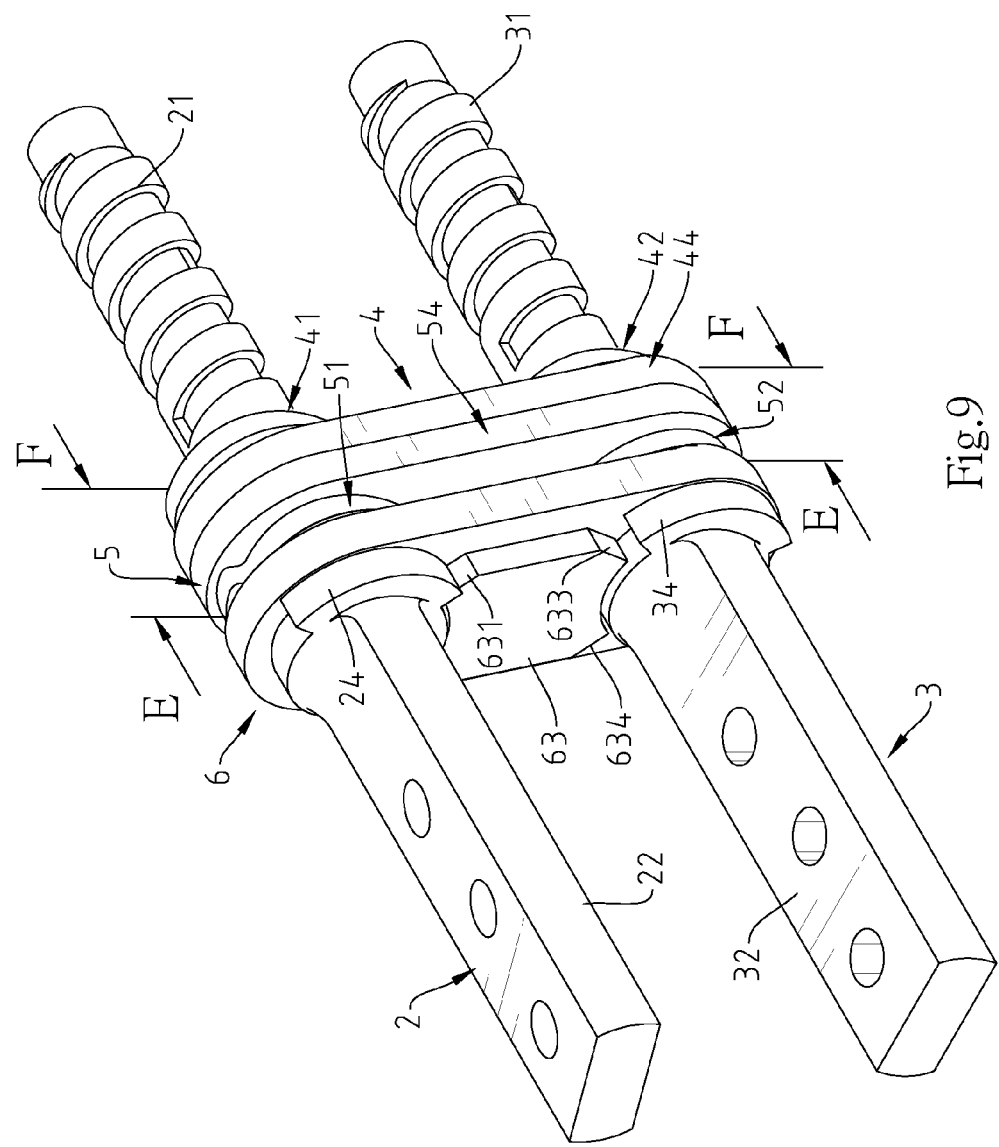
FIG. 9 is a schematic elevational view of the first embodiment of the present invention, illustrating an operation status of the position-limit hinge.
Figure 13:
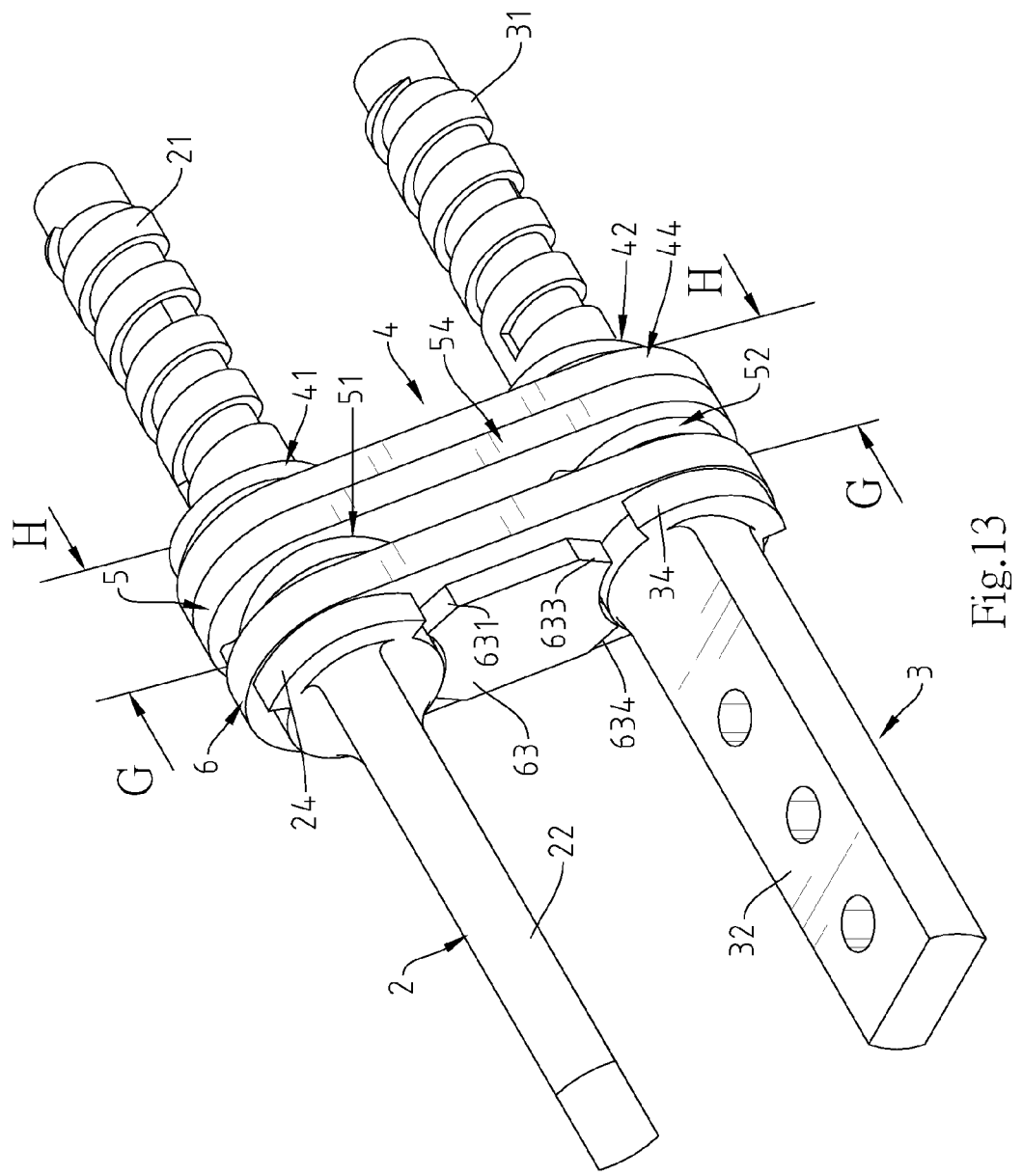
FIG. 13 is a schematic elevational view of the first embodiment of the present invention, illustrating another operation status of the position-limit hinge.

Referring to FIGS. 1-8, a position-limit hinge in accordance with a first embodiment of the present invention is shown. The position-limit hinge comprises an axle housing 1, a first hinge shaft 2, a second hinge shaft 3, a first position-limit device set 4 a second position-limit device set 5, and a positioning member 6.

The axle housing 1 defines therein a first axle hole 11 and a second axle hole 12.

The first hinge shaft 2 comprises a first shaft portion 21 located at one end thereof and rotatably inserted into the first axle hole 11 of the axle housing 1, a first mounting portion 22 located at an opposite end thereof and fixedly fastened to a cover member 71 of an electronic device 7 and exposed to the outside of the axle housing 1, a first position-limit portion 23 connected between the first shaft portion 21 and the first mounting portion 22 and exposed to the outside of the axle housing 1, and a first stop flange 24 extending around the periphery thereof between the first mounting portion 22 and the first position-limit portion 23.

The second hinge shaft 3 comprises a second shaft portion 31 located at one end thereof and rotatably inserted into the second axle hole 12 of the axle housing 1, a second mounting portion 32 located at an opposite end thereof and fixedly fastened to a base member 72 of the electronic device 7 and exposed to the outside of the axle housing 1, a second position-limit portion 33 connected between the second shaft portion 31 and the second mounting portion 32 and exposed to the outside of the axle housing 1, and a second stop flange 34 extending around the periphery thereof between the second mounting portion 32 and the second position-limit portion 33.

The first position-limit device set 4 comprises a first cam wheel 41, a second cam wheel 42, a first position-limit member 43 and a first locating plate 44. The first locating plate 44 comprises a first pivot hole 441 located at one end thereof and pivotally coupled to the first position-limit portion 23 of the first hinge shaft 2, a second pivot hole 442 located at an opposite end thereof and pivotally coupled to the second position-limit portion 33 of the second hinge shaft 3, a first sliding slot 443 spaced between the first pivot hole 441 and the second pivot hole 442, and two first position-limit portions 444 disposed in the first sliding slot 443 at two opposite lateral sides. The first cam wheel 41 and the second cam wheel 42 are disposed at one same side relative to the first locating plate 44. The first cam wheel 41 comprises a first mounting hole 411 fastened to the first position-limit portion 23 of the first hinge shaft 2, a first actuation barrel 412 surrounding the first mounting hole 411, a first upper limit position 413 located at one end of the first actuation barrel 412 near the second hinge shaft 3 and a first lower limit position 414 located at an opposite end of the first actuation barrel 412. The second cam wheel 42 comprises a second mounting hole 421 fastened to the second position-limit portion 33 of the second hinge shaft 3, a second actuation barrel 422 surrounding the second mounting hole 421, a second upper limit position 423 located at one end of the second actuation barrel 422, and a second lower limit position 424 located at an opposite end of the second actuation barrel 411 near the first hinge shaft 2. The first position-limit member 43 comprises a first body 431 slidably inserted into the first sliding slot 443 between the first cam wheel 41 and the second cam wheel 42, and two first stop plates 432 respectively extended from two opposite lateral sides of the first body 431 and slidably supported on the first position-limit portions 444. Further, the first upper limit position 413 of the first cam wheel 41 and the second lower limit position 424 of the second cam wheel 42 are respectively stopped at opposing top and bottom sides of the first body 431.

The second position-limit device set 5 comprises a third cam wheel 51, a fourth cam wheel 52, a second position-limit member 53 and a second locating plate 54. The second locating plate 54 comprises a third pivot hole 541 located at one end thereof and pivotally coupled to the first position-limit portion 23 of the first hinge shaft 2, a fourth pivot hole 542 located at an opposite end thereof and pivotally coupled to the second position-limit portion 33 of the second hinge shaft 3, a second sliding slot 543 spaced between the third pivot hole 541 and the fourth pivot hole 542, and two second position-limit portions 544 disposed in the second sliding slot 543 at two opposite sides. The third cam wheel 51 and the fourth cam wheel 52 are disposed at one same side relative to the second locating plate 54. The third cam wheel 51 comprises a third mounting hole 511 fastened to the first position-limit portion 23 of the first hinge shaft 2, a third actuation barrel 512 surrounding the third mounting hole 511, a third upper limit position 513 located at one end of the third actuation barrel 512, and a third lower limit position 514 located at one end of the third actuation barrel 512 near the second hinge shaft 3. The fourth cam wheel 52 comprises a fourth mounting hole 521 fastened to the second position-limit portion 33 of the second hinge shaft 3, a fourth actuation barrel 522 surrounding the fourth mounting hole 521, a fourth upper limit position 523 located at one end of the fourth actuation barrel 522 near the first hinge shaft 2, and a fourth lower limit position 524 located at an opposite end of the fourth actuation barrel 522. The second position-limit member 53 comprises a second body 531 slidably inserted into the second sliding slot 543 and disposed between third cam wheel 51 and the fourth cam wheel 52, and two second stop plates 532 respectively extended from two opposite lateral sides of the second body 531 and slidably supported on the second position-limit portions 544. Further, the third lower limit position 514 of the third cam wheel 51 and the fourth upper limit position 523 of the fourth cam wheel 52 are respectively stopped at opposing top and bottom sides of the second body 531.

The positioning member 6 is disposed at one side relative to the second position-limit device set 5, comprising a fifth pivot hole 61 located at one end thereof and pivotally coupled to the first position-limit portion 23 of the first hinge shaft 2, a sixth pivot hole 62 located at an opposite end thereof and pivotally coupled to the second position-limit portion 33 of the second hinge shaft 3, a raised position-limit portion 63 spaced between the fifth pivot hole 61 and the sixth pivot hole

62, a first stop wall 631 and a second stop wall 632 bilaterally located at a top side of the raised position-limit portion 63, and a third stop wall 633 and a fourth stop wall 634 bilaterally located at an opposing bottom side of the raised position-limit portion 63. Further, the first stop flange 24 of the first hinge shaft 2 is disposed between the first stop wall 631 and second stop wall 632 of the position-limit portion 63. The second stop flange 34 of the second hinge shaft 3 is disposed between the third stop wall 633 and fourth stop wall 634 of the position-limit portion 63.

Figure 17:
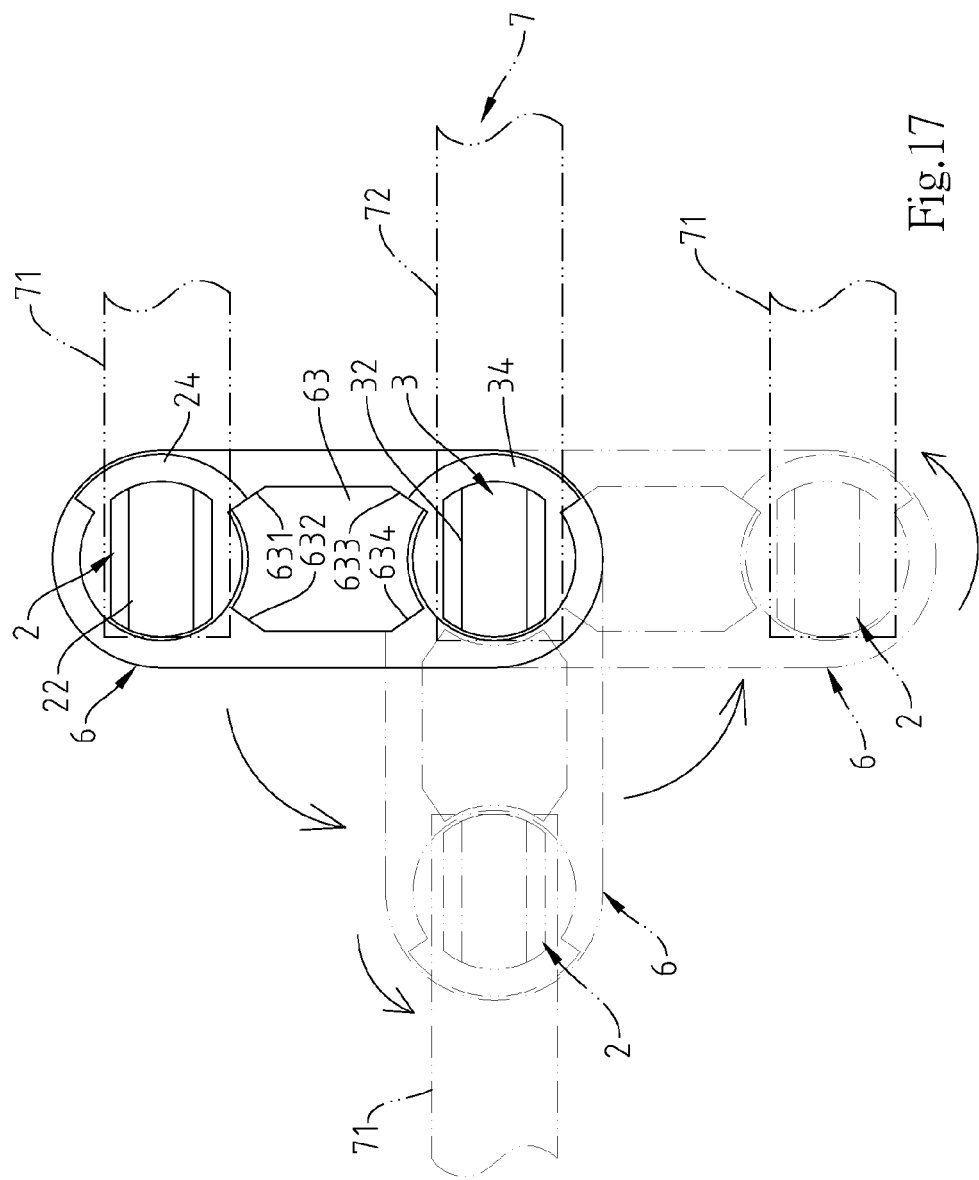
FIG. 17 is a schematic drawing of the first embodiment of the present invention, illustrating the operation of the position-limit hinge with the movement of the cover member of the electronic device from the top side of the base member to the bottom side thereof.
Figure 18:
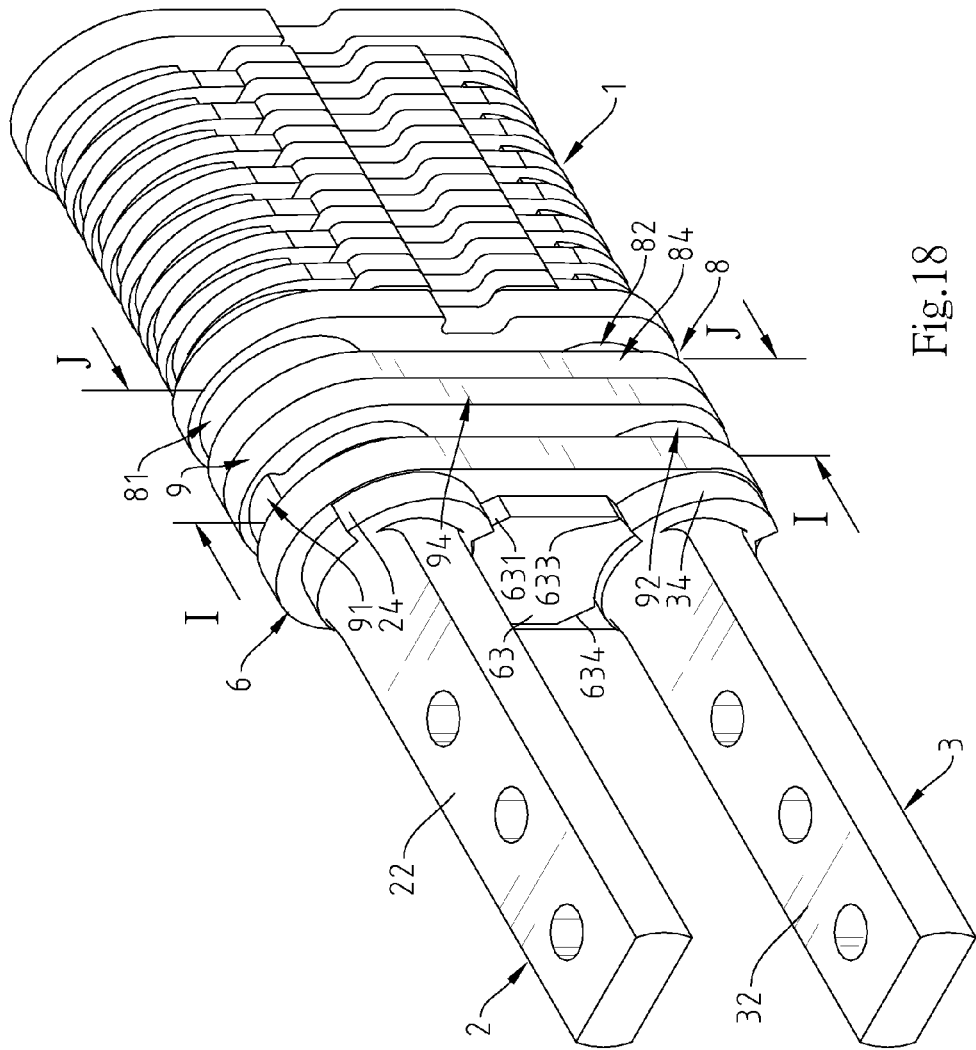
FIG. 18 is an elevational view of a position-limit hinge in accordance with a second embodiment of the present invention.
Figure 22:
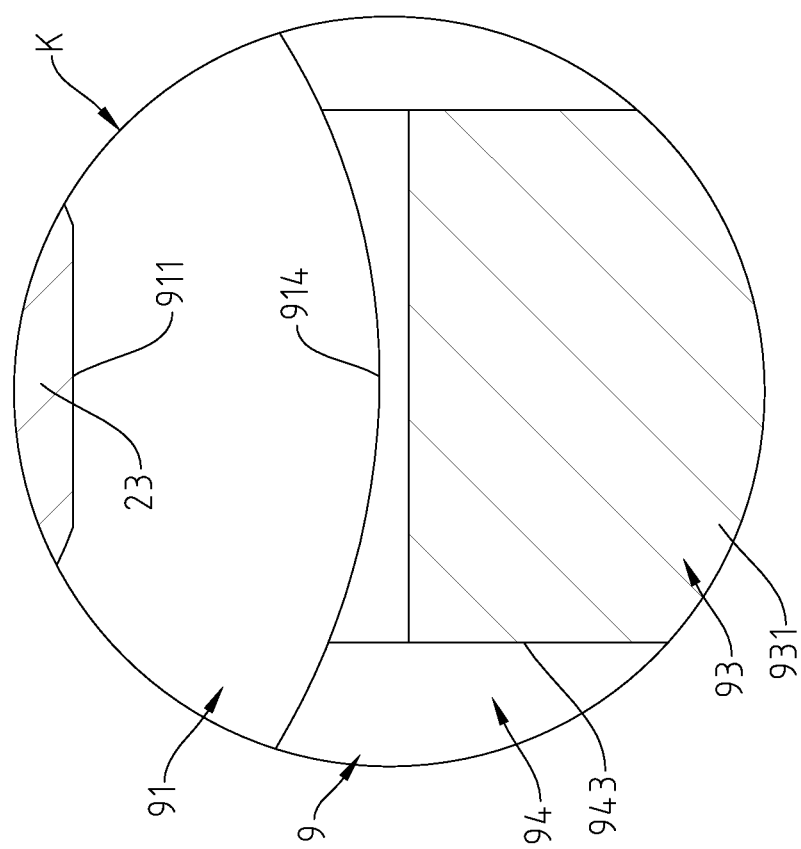
FIG. 22 is an enlarged view of Part K of FIG. 20.
Figure 23:
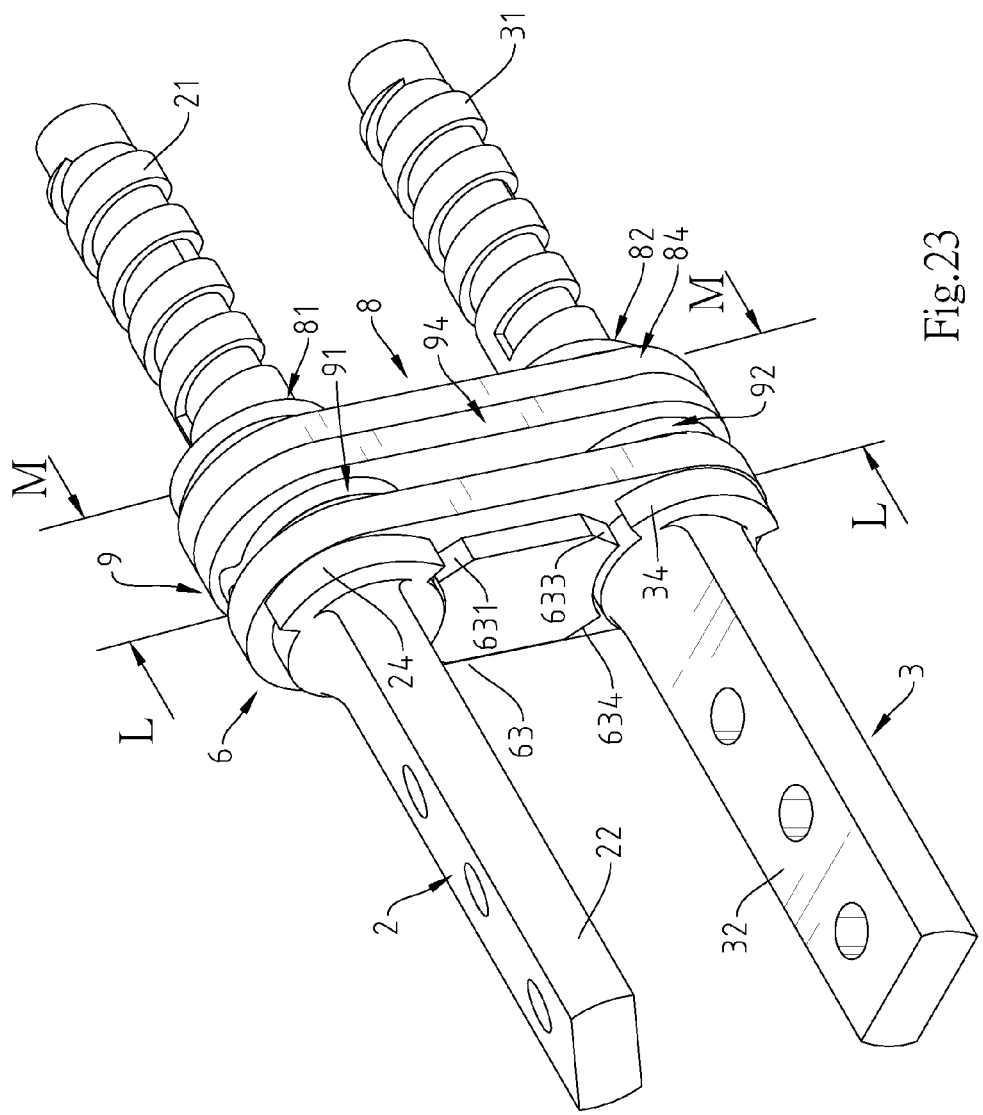
FIG. 23 is a schematic elevational operational view of the position-limit hinge in accordance with the second embodiment of the present invention.

Referring to FIGS. 1, 4, 5 and FIGS. 9-17, the third lower limit position 514 of the third cam wheel 51 of the second position-limit device set 5 and the fourth upper limit position 523 of the fourth cam wheel 52 are stopped at the second body 531 of the second position-limit member 53, i.e., the distance between the third lower limit position 514 and the fourth upper limit position 523 is equal to the distance between the top and bottom sides of the second body 531, as illustrated in FIGS. 4 and 5, and therefore, the rotation of the third cam wheel 51 and the rotation of the fourth cam wheel 52 are limited; the first upper limit position 413 of the first cam wheel 41 of the first position-limit device set 4 is stopped at the top side of the first body 431 and the bottom side of the first body 431 is stopped at the second lower limit position 424 of the second cam wheel 42 opposite to the second upper limit position 423, i.e., the second cam wheel 42 is biased on the second lower limit position 424 in direction away from the second upper limit position 423 through an angle θ, thus, the second cam wheel 42 can be rotated through an angle θ; as illustrated in FIGS. 9-17, when the user open the cover member 71 of the electronic device 7, the third lower limit position 514 and fourth upper limit position 523 of the second position-limit device set 5 are stopped at the second body 531 of the second position-limit member 53, and the second cam wheel 42 of the first position-limit device set 4 can be biased through an angle θ, therefore, opening the cover member 71 of the electronic device 7 will drive the axle housing 1 to turn about the second hinge shaft 3, causing the first position-limit member 43 of the first position-limit device set 4 to turn about the second hinge shaft 3; when the axle housing 1 is turned to the position where the bottom side of the first position-limit member 43 is stopped at the second lower limit position 424 of the second cam wheel 42, the first position-limit device set 4 becomes rotatable; during turning of the axle housing 1, the second position-limit member 53 of the second position-limit device set 5 will be turned about the second hinge shaft 3 in direction from the fourth upper limit position 523 of the fourth cam wheel 52 toward the fourth lower limit position 524, i.e., the distance between the third actuation barrel 512 and the fourth actuation barrel 522 will be gradually increased, causing the second position-limit device set 5 to be changed from the position-limit status to a freely rotatable status; when the user keeps opening the cover member 71 after the first position-limit device set 4 is stopped from movement, the first hinge shaft 2 will be rotated, driving the first cam wheel 41 to rotate in direction from the first upper limit position 413 toward the first lower limit position 414; because the first cam wheel 41 is rotated in direction from the first upper limit position 413 toward the first lower limit position 414 at this time, the distance between the first actuation barrel 412 and the second actuation barrel 422 will be gradually increased to become larger than the distance between the opposing top and bottom sides of the first body 431, causing the first position-limit device set 4 to be changed from the position-limit status to a freely rotatable status; further, during rotation of the first hinge shaft 2, the third cam wheel 51 of the second position-limit device set 5 will be rotated in the same rotating direction of the first hinge shaft 2; at this time, the third cam wheel 51 is rotated in direction from the third lower limit position 514 toward the third upper limit position 513, therefore, the distance between the third actuation barrel 512 and the fourth actuation barrel 522 will be gradually increased at this time, causing the third lower limit position 514 of the third cam wheel 51 and the fourth upper limit position 523 of the fourth cam wheel 52 to be respectively stopped at the opposing top and bottom sides of the second body 531; as soon as the third lower limit position 514 and the fourth upper limit position 523 are respectively stopped at the opposing top and bottom sides of the second body 531, the second position-limit device set 5 is stopped from movement, prohibiting the second hinge shaft 2 from rotation; as illustrated in FIG. 17, repeating the aforesaid procedure enables the cover member 71 to be turned to the bottom side of the base member 72.

Referring to FIGS. 18-26, in a second embodiment of the present invention, the distance between the third lower limit position 914 of the third cam wheel 91 of the second position-limit device set 9 and the fourth upper limit position 923 of the fourth cam wheel 92 at the initial point is larger than the distance between the opposing top and bottom sides of the second body 931, therefore a gap exists between the third cam wheel 91 and the second body 931, allowing the second position-limit device set 9 to be freely rotated; the distance between the first upper limit position 813 of the first cam wheel 81 of the first position-limit device set 8 and the second lower limit position 824 of the second cam wheel 82 at the initial point is equal to the distance between the opposing top and bottom sides of the first body 831, therefore the first upper limit position 813 and the second lower limit position 824 are respectively stopped at the opposing top and bottom sides of the first body 831, and thus, rotation of the first position-limit device set 8 is limited; when the user opens the cover member 71 of the electronic device 7, the first upper limit position 813 and second lower limit position 824 of the first position-limit device set 8 are respectively stopped at the opposing top and bottom sides of the first body 831, the first cam wheel 81 can simply be rotated in direction from the first upper limit position 813 toward the first lower limit position 814, thus, opening the cover member 71 of the electronic device 7 drives the first hinge shaft 2 to rotate in direction from the first upper limit position 813 toward the first lower limit position 814; because the first cam wheel 81 is rotated in direction from the first upper limit position 813 toward the first lower limit position 814 at this time, the distance between the first actuation barrel 812 and the second actuation barrel 822 is gradually increased to become larger than the distance between the opposing top and bottom sides of the first body 831, causing the first position-limit device set 8 to be changed from the position-limit status to a freely rotatable status; during rotation of the first hinge shaft 2, the third cam wheel 91 of the second position-limit device set 9 is rotated in the same rotating direction of the first hinge shaft 2, at this time, the third cam wheel 51 is rotated in direction from the third lower limit position 914 toward the third upper limit position 913, therefore, the distance between the third actuation barrel 912 and the fourth actuation barrel 922 is gradually reduced, causing the third lower limit position 914 of the third cam wheel 91 and the fourth upper limit position 923 of the fourth cam wheel 92 to be respectively stopped at the opposing top and bottom sides of the second body 931; as soon as the third lower limit position 914 and the fourth upper limit position 923 are respectively stopped at the opposing top and bottom sides of the second body 931, the second position-limit device set 9 is stopped from movement, prohibiting the second hinge shaft 2 from rotation; thus, when the user keeps opening the cover member 71, the axle housing 1 will be turned about the second hinge shaft 3, driving the second position-limit member 93 of the second position-limit device set 9 to turn about the second hinge shaft 3 in direction from the fourth upper limit position 923 of the fourth cam wheel 92 toward the fourth lower limit position 924, and thus, the distance between the third actuation barrel 912 and the fourth actuation barrel 922 will be gradually increased, causing the second position-limit device set 9 to be changed from the position-limit status to a freely rotatable status; when turning the axle housing 1 about the second hinge shaft 3, the first position-limit member 83 of the first position-limit device set 8 is moved in direction from the second lower limit position 824 of the second cam wheel 82 toward the second upper limit position 823, and therefore the distance between the first actuation barrel 812 and the second actuation barrel 822 will be gradually reduced, causing the first upper limit position 813 and the second lower limit position 824 to be respectively stopped at the opposing top and bottom sides of the first body 831; at this time, the first position-limit device set 8 is stopped from movement, prohibiting the axle housing 1 from movement; when the user keeps opening the cover member 71 after the first position-limit device set 8 is stopped from movement, the first hinge shaft 2 will be rotated, causing the second position-limit device set 9 to be changed from the freely rotatable status to a position-limit status and the first position-limit device set 8 to be changed from the position-limit status to a freely rotatable status; repeating the aforesaid procedure causes the cover member 71 to be turned to the bottom side of the base member 72.

Therefore, the technical features of the present invention that eliminate the drawbacks of the prior art designs are as follows:

(1) The invention enables the first position-limit device set 4 and the second position-limit device set 5 to be alternatively changed between a position-limit status and a freely rotatable status, so that only the first hinge shaft 2 is rotated or the axle housing 1 is turned about the second hinge shaft 3 at a specific time, facilitating accurate control of the range and order of rotation; thus, when turning the cover member 71 through 180°, the cover member 71 and the base member 72 can be kept in horizontal; the cover member 71 can be closed on the base member 72, or opened and attached to the bottom side of the base member 72.

(2) The invention enables the first cam wheel 41, the second cam wheel 42, the third cam wheel 51 and the fourth cam wheel 52 to be alternatively stopped and rotated to bear external force, preventing breaking or component damage.

What the invention claimed is:

1. A position-limit hinge, comprising an axle housing, a first hinge shaft, a second hinge shaft, a first position-limit device set and a second position-limit device set, wherein:
   said axle housing comprises a first axle hole and a second axle hole;
   said first hinge shaft comprises a first shaft portion located at one end thereof and rotatably inserted into said first axle hole of said axle housing, and a first position-limit portion located at one end of said first shaft portion and exposed to an outside of said axle housing;
   said second hinge shaft comprises a second shaft portion, said second shaft portion located at one end thereof and rotatably inserted into said second axle hole of said axle housing, and a second position-limit portion located at one end of said second shaft portion and exposed to the outside of said axle housing;
   said first position-limit device set comprises a first cam wheel, a second cam wheel and a first position-limit member, said first cam wheel comprising a first mounting hole fastened to said first position-limit portion of said first hinge shaft and a first actuation barrel surrounding said first mounting hole, said second cam wheel comprising a second mounting hole fastened to said second position-limit portion of said second hinge shaft and a second actuation barrel surrounding said second mounting hole, said first position-limit member being disposed between said first cam wheel and said second cam wheel, said first position-limit member having opposing top and bottom sides thereof respectively stopped against said first actuation barrel and said second actuation barrel;
   said second position-limit device set comprises a third cam wheel, a fourth cam wheel and a second position-limit member, said third cam wheel comprising a third mounting hole fastened to said first position-limit portion of said first hinge shaft and a third actuation barrel surrounding said third mounting hole, said fourth cam wheel comprising a fourth mounting hole fastened to said second position-limit portion of said second hinge shaft and a fourth actuation barrel surrounding said fourth mounting hole, said second position-limit member being disposed between said third cam wheel and said fourth cam wheel, said second position-limit member having opposing top and bottom sides thereof respectively stopped against said third actuation barrel and said fourth actuation barrel.

2. The position-limit hinge as claimed in claim 1, wherein said first actuation barrel of said first cam wheel comprises a first upper limit position and a first lower limit position respectively located at two opposite sides thereof, said first upper limit position being disposed near said second hinge shaft; said second actuation barrel of said second cam wheel comprises a second upper limit position and a second lower limit position respectively located at two opposite sides thereof, said second lower limit position being disposed near said first hinge shaft; said first position-limit member has opposing top and bottom sides thereof respectively stopped against said first upper limit position and said second lower limit position.

3. The position-limit hinge as claimed in claim 1, wherein said third actuation barrel of said third cam wheel comprises a third upper limit position and a third lower limit position respectively located at two opposite sides thereof, said third lower limit position being disposed near said second hinge shaft; said fourth actuation barrel of said fourth cam wheel comprises a fourth upper limit position and a fourth lower limit position respectively located at two opposite sides thereof, said fourth upper limit position being disposed near said first hinge shaft; said second position-limit member has opposing top and bottom sides thereof respectively stopped against said third lower limit position and said fourth upper limit position.

4. The position-limit hinge as claimed in claim 1, wherein said first position-limit device set comprises a first locating plate, said first locating plate comprising a first pivot hole located at one end thereof and pivotally coupled to said first position-limit portion of said first hinge shaft, a second pivot hole located at an opposite end thereof and pivotally coupled to said second position-limit portion of said second hinge shaft, a first sliding slot spaced between said first pivot hole and said second pivot hole and two first position-limit portions located in said first sliding slot at two opposite sides; said first position-limit member comprises a first body slidably inserted through said first sliding slot and two first stop plates respectively extended from two opposite lateral sides of said first body and slidably supported on said first position-limit portions; said first actuation barrel of said first cam wheel and said second actuation barrel of said second cam wheel are respectively stopped at opposing top and bottom sides of said first body.

5. The position-limit hinge as claimed in claim 1, wherein said second position-limit device set comprises a second locating plate, said second locating plate comprising a third pivot hole located at one end thereof and pivotally coupled to said first position-limit portion of said first hinge shaft, a fourth pivot hole located at an opposite end thereof and pivotally coupled to said second position-limit portion of said second hinge shaft, a second sliding slot spaced between said third pivot hole and said fourth pivot hole and two second position-limit portions located in said second sliding slot at two opposite lateral sides; said second position-limit member comprises a second body slidably inserted through said second sliding slot, second body and two second stop plates respectively extended from two opposite lateral sides of said second body and slidably supported on said second position-limit portions; said third actuation barrel of said third cam wheel and said fourth actuation barrel of said fourth cam wheel are respectively stopped against opposing top and bottom sides of said second body.

6. The position-limit hinge as claimed in claim 1, further comprising a positioning member disposed at one side relative to said second position-limit device set, wherein said positioning member comprises a fifth pivot hole located at one end thereof and pivotally coupled to said first position-limit portion of said first hinge shaft, a sixth pivot hole located at an opposite end thereof and pivotally coupled to said second position-limit portion of said second hinge shaft, a raised position-limit portion spaced between said fifth pivot hole and said sixth pivot hole, a first stop wall and a second stop wall respectively bilaterally located at a top side of said raised position-limit portion, and a third stop wall and a fourth stop wall bilaterally located at an opposing bottom side of said raised position-limit portion; said first hinge shaft further comprises a first stop flange extending around the periphery thereof and abutted against said first position-limit portion and disposed between said first stop wall and said second stop wall of said raised position-limit portion; said second hinge shaft further comprises a second stop flange extending around the periphery thereof and abutted against said second position-limit portion and disposed between said third stop wall and said fourth stop wall of said raised position-limit portion.

* * * * *